United States Patent
Smith et al.

(10) Patent No.: US 10,761,831 B2
(45) Date of Patent: Sep. 1, 2020

(54) LIFT SYSTEM AUTHENTICATION MODULE

(71) Applicant: Vehicle Service Group, LLC, Madison, IN (US)

(72) Inventors: Darian Smith, Madison, IN (US); Robert William Elliott, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 0 days.

(21) Appl. No.: 16/104,519

(22) Filed: Aug. 17, 2018

(65) Prior Publication Data

US 2020/0057623 A1  Feb. 20, 2020

(51) Int. Cl.
| | | |
|---|---|---|
| *G06F 8/65* | (2018.01) | |
| *G05B 19/042* | (2006.01) | |
| *G06F 21/44* | (2013.01) | |
| *B66F 7/00* | (2006.01) | |

(52) U.S. Cl.
CPC ........... *G06F 8/65* (2013.01); *G05B 19/0426* (2013.01); *G06F 21/44* (2013.01); *B66F 7/00* (2013.01); *G05B 2219/25064* (2013.01)

(58) Field of Classification Search
None
See application file for complete search history.

(56) References Cited

U.S. PATENT DOCUMENTS

| | | | |
|---|---|---|---|
| 6,983,196 B2 | 1/2006 | Green et al. | |
| 7,191,038 B2 | 3/2007 | Green et al. | |
| 8,083,034 B2 | 12/2011 | Bordwell et al. | |
| 9,530,019 B1* | 12/2016 | Cosentino | G06F 17/5009 |
| 9,611,128 B2* | 4/2017 | Van Houten | B66F 3/46 |
| 10,059,576 B2 | 8/2018 | Jaipaul et al. | |
| 2004/0149520 A1 | 8/2004 | Taylor et al. | |
| 2004/0228360 A1* | 11/2004 | Bae | H04L 9/0869 370/432 |
| 2010/0071034 A1* | 3/2010 | Furuichi | G06F 21/608 726/4 |
| 2010/0293611 A1* | 11/2010 | Ablabutyan | B60P 1/4471 726/17 |
| 2014/0164721 A1* | 6/2014 | Chakra | G06F 12/122 711/160 |

(Continued)

FOREIGN PATENT DOCUMENTS

DE  102016215742 A1  3/2018

*Primary Examiner* — Daxin Wu
(74) *Attorney, Agent, or Firm* — Frost Brown Todd LLC

(57) ABSTRACT

An authentication module may be internally or externally installed on a lift control of a vehicle lift and allows new and updated features to be added to the vehicle lift without requiring a connection to a local or cellular network. The authentication module connects to one or more other electrical components of the lift control to allow for the exchange of data. A module containing software and configurations for enabling a feature may be removably attached to the authentication module, which uses the stored configurations to verify and enable the associated feature. The use of enabled features may be persistently tracked by the authentication module even in the absence of an external power source or network connection, and may be disabled by the authentication module if the feature use expires or is exhausted.

21 Claims, 16 Drawing Sheets

(56) References Cited

U.S. PATENT DOCUMENTS

| | | | |
|---|---|---|---|
| 2014/0237614 A1* | 8/2014 | Irvine | G06F 21/6218 726/26 |
| 2015/0246797 A1* | 9/2015 | Jaipaul | B66F 3/46 700/225 |
| 2016/0085385 A1 | 3/2016 | Gao et al. | |
| 2016/0272472 A1* | 9/2016 | Jaipaul | B66F 13/00 |
| 2018/0012433 A1* | 1/2018 | Ricci | G08G 1/096775 |

* cited by examiner

LIFT SYSTEM AUTHENTICATION MODULE

A vehicle lift is a device operable to lift a vehicle such as a car, truck, bus, etc. Some vehicle lifts operate by positioning superstructures under a vehicle. Thereafter, the superstructures may be raised or lowered to bring the vehicle to a desired height. Once the user has completed his or her task requiring the vehicle lift, the vehicle may then be lowered.

Examples of such vehicle lift devices and related concepts are disclosed in U.S. Pat. No. 6,983,196, entitled "Electronically Controlled Vehicle Lift and Vehicle Service System," issued Jan. 3, 2006, the disclosure of which is incorporated by reference herein; U.S. Pat. No. 7,191,038, entitled "Electronically Controlled Vehicle Lift and Vehicle Service System," issued Mar. 13, 2007, the disclosure of which is incorporated by reference herein; U.S. Pat. No. 8,083,034, entitled "Lift Control Interface," issued Dec. 27, 2011, the disclosure of which is incorporated by reference herein; and U.S. Pub. No. 2004/0149520, entitled "Inground Lift," published Aug. 5, 2004, the disclosure of which is incorporated by reference herein.

Software has become an important component of many electronically controlled devices, and consumers increasingly expect software to be improved and updated over the life of a device, whether it be a mobile phone, an internet connected refrigerator, or even a vehicle lift. Software updates may commonly include fixes that address errors or improve the efficiency or usability of a prior version of the software (e.g., by addressing run-time errors that cause a software-driven device to lock up or restart, or by reorganizing functions to reduce unnecessary computations), but may also include new data or configuration changes that can make entirely new features available on a device, or significantly improve the performance of an existing feature.

As one example of improving the performance of an existing feature, automotive manufacturers are increasingly replacing mechanical linkages with drive-by-wire systems, such that inputs to a steering wheel, gas pedal, or brake pedal are now received as electronic signals and interpreted by software in order to cause a vehicle to change direction, accelerate, or brake. Improvements to the software that interprets and reacts to those electronic signals can result in major improvements to the drivability and safety of such a vehicle, making the vehicle accelerate more quickly or steadily, brake more steadily or effectively, or steer more precisely.

As one example of providing new features to a device, some devices may have capabilities that are possible without any hardware changes, but that are unconfigured or disabled when the device is first purchased. For example, a vehicle lift may have storage and computing capabilities that would, if accessed or implemented by software, allow it to store a variety of preset positions for its movable components such that it could adjust itself to a selected preset position with a single button touch. In some cases, such software may not be configured on the vehicle lift, but could be added via a software update including all the instructions required to implement such a feature. In some cases, the software may be configured on the vehicle lift, but may be disabled or otherwise inoperative until an unlock key or code is input to a control interface of the lift in order to enable it.

One difficulty in updating the features or performance of a vehicle lift is that it cannot be assumed that such systems will always be connected to a network and readily available for software updates or other configuration changes, as may be the case with some devices. This limitation on connectivity may be due to limitations of the vehicle lift itself or the setting in which the lift is used, or may be intentional to reduce the risks associated with placing a piece of heavy equipment online and potentially allowing bad actors to remotely control it.

BRIEF DESCRIPTION OF THE DRAWINGS

While the specification concludes with claims that particularly point out and distinctly claim the invention, it is believed the present invention will be better understood from the following description of certain examples taken in conjunction with the accompanying drawings, in which like reference numerals identify the same elements and in which:

Figure 1:
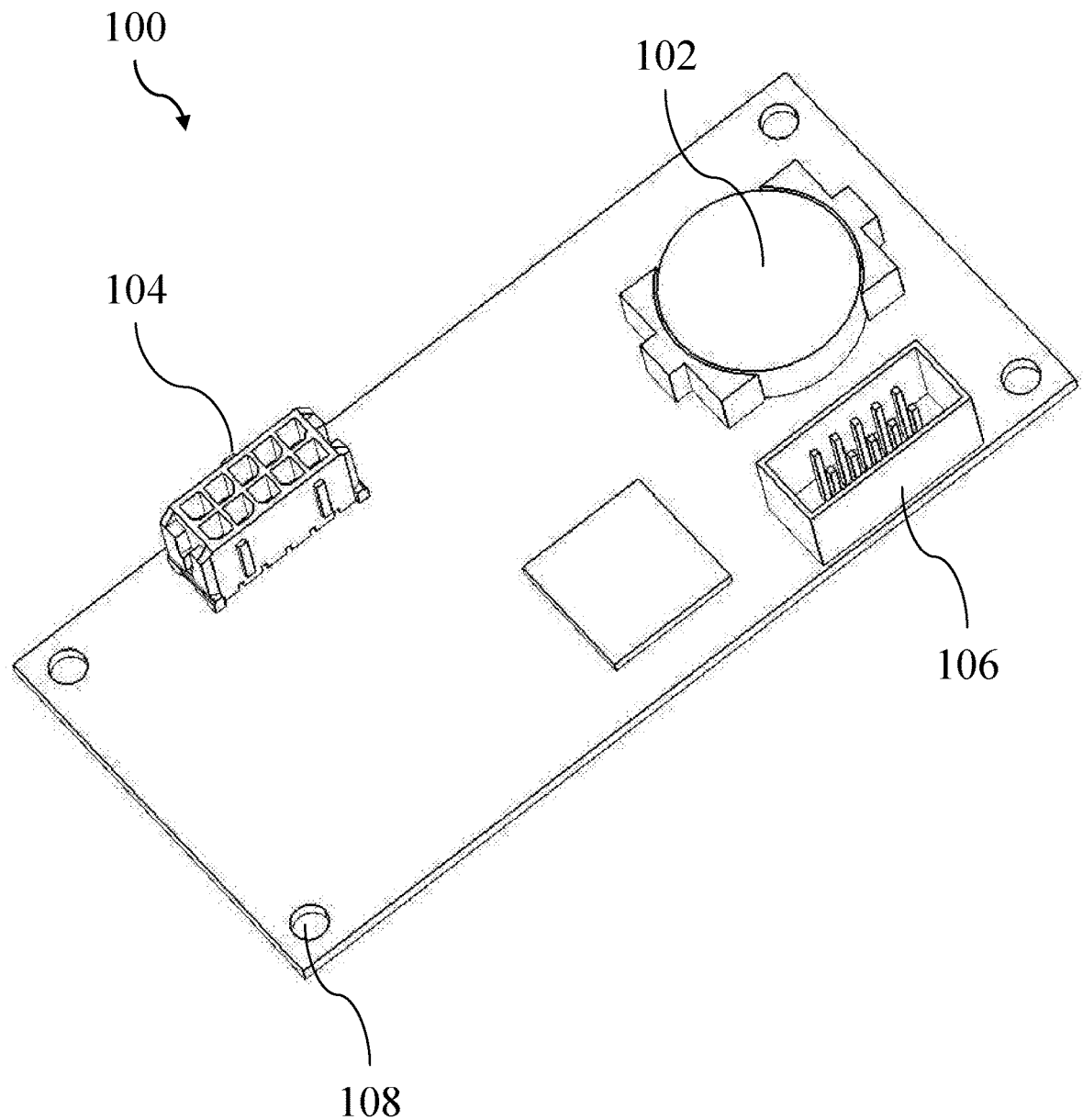
FIG. 1 shows a front perspective view of an exemplary authentication module.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 2:
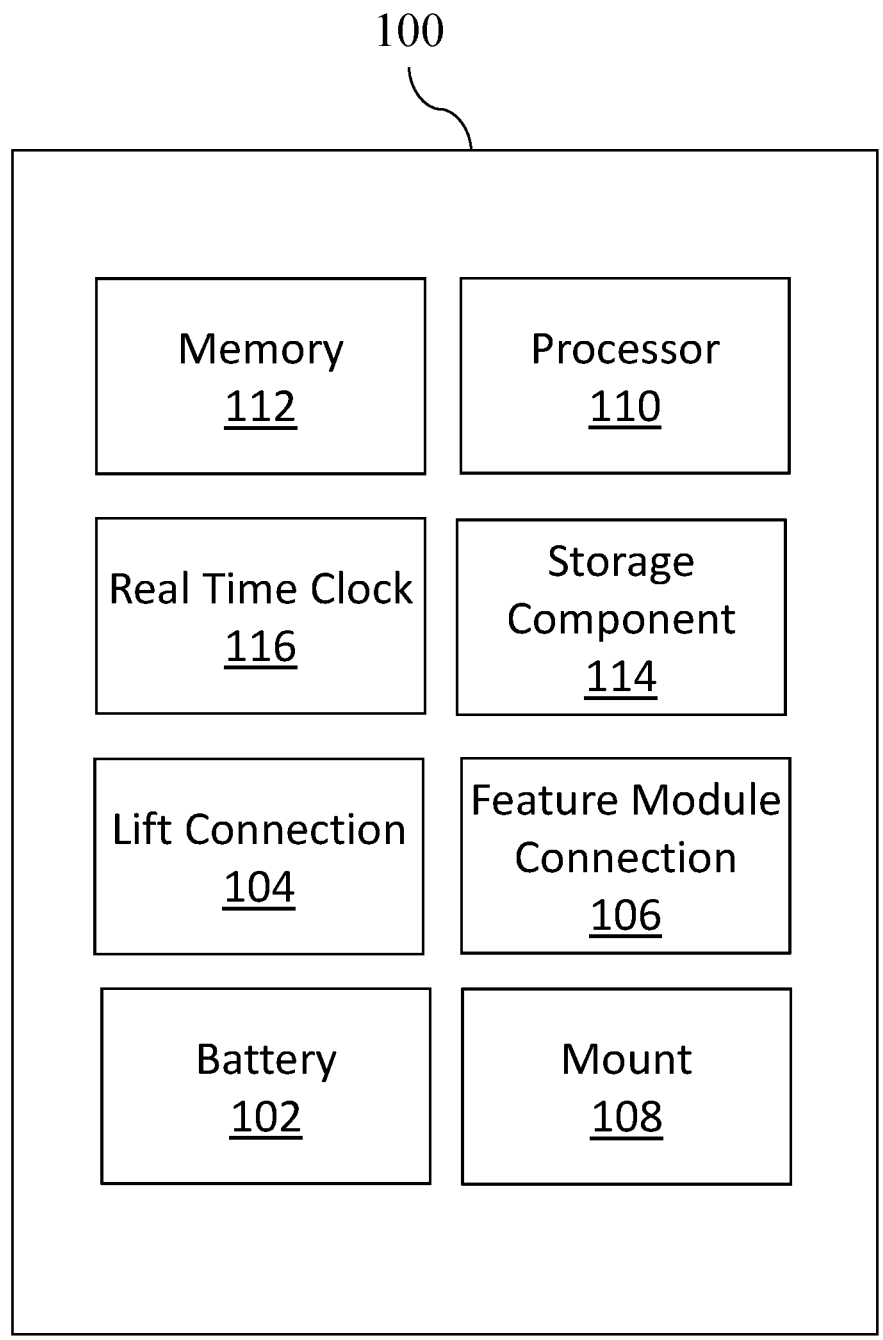
FIG. 2 shows a schematic diagram of the authentication module.

Turning now to the figures, FIGS. 1 and 2 respectively show a front perspective view and a schematic view of an exemplary authentication module (100). The authentication module (100) is comprised of a battery (102), a lift connection (104), a programmer connection (106), a set of mounts (108), a processor (110) and associated memory (112), a storage component (114), and a real-time clock (116). While the authentication module (100) shown in FIG. 1 is implemented as a circuit board, it should be understood that an authentication module may be implemented in a variety of ways as will occur to those skilled in the art. For example, an authentication module having similar capabilities as the authentication module (100) could be implemented as a component intended to be installed within an existing device or system such as a board, chip, or card, or could be implemented as an external device having its own case, connections, and proprietary design.

The authentication module (100) shown in FIG. 1 may advantageously be installed on a vehicle lift at the time of initial manufacture or lift installation, but may also be installed by an end user at some point during ownership. Once installed on a vehicle lift, the authentication module (100) may be used to provide additional features and functionality to the vehicle lift as will be described in greater detail below. Features and functionality will vary, but may include for example features for positioning movable components of the lift manually or automatically (e.g., limiters for electrical motor output intended to improve motor life and reduce maintenance costs, one-touch positioning for a vehicle based upon a selected profile or positioning sensor output), safety features that are usable with the vehicle lift (e.g., wireless tracking of beacons worn by technicians and disabling movement when they are proximate to the vehicle lift, reducing electrical motor output when high temperatures are detected), and instructional features that are usable with the vehicle lift (e.g., audio or visual display of step-by-step procedures to be performed with the lift, including those implemented with augmented reality devices and systems).

The processor (110) and memory (112) may be of a type appropriate for receiving data from, manipulating data, and transmitting data to other components of the authentication module (100), including the real-time clock (116), the storage component (114), the lift connection (104), and the programmer connection (106). The processor (110) and memory (112) may be configured with instructions that may be executed in order to perform steps associated with the disclosed system and method, including one or more of those shown and described in FIGS. 8-16. In some embodiments processor (110) is a microcontroller or general purpose microprocessor that reads its program from the memory (112). The processor (110) may be comprised of one or more components configured as a single unit. Alternatively, when of a multi-component form, the processor may have one or more components located remotely relative to the others. One or more components of the processor (110) may be of the electronic variety including digital circuitry, analog circuitry, or both. In some embodiments, the processor is of a conventional, integrated circuit microprocessor arrangement. In alternative embodiments, one or more reduced instruction set computer (RISC) processors, application-specific integrated circuits (ASICs), general-purpose microprocessors, programmable logic arrays, or other devices may be used alone or in combinations as will occur to those skilled in the art.

Likewise, the memory (112) in various embodiments includes one or more types such as solid-state electronic memory, magnetic memory, or optical memory, just to name a few. By way of non-limiting example, the memory (112) can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a solid-state or hybrid drive; or a plurality and/or combination of these memory types. Also, the memory (112) in various embodiments is volatile, nonvolatile, or a hybrid combination of volatile and nonvolatile varieties, and it may be integrated with other components such as processor (110).

The real-time clock (116) is configured to track the passage of time and provide a current time or an indication of an elapsed time to the processor (110). The real-time clock (116) consumes an insignificant amount of power while tracking time, and may be powered by the battery (102) or an integrated capacitor for extended periods even in the absence of any other power source, so that the current time or an elapsed time may be accurately maintained even when the authentication module (100) is not connected to any other device or power source (e.g., during shipment, before installation on a vehicle lift, or after removal from a vehicle lift).

The storage component (114) is configured to store received data, and can store data received from the processor (110) so that it may later be modified or referenced by the processor (110) or another connected device. The storage component (114) may be, for example, an integrated or removable solid-state drive, flash drive, memory card, or other data storage device capable of being written to and read from, and capable of storing written data for extended periods of time in the absence of a persistent external power source. The storage component (114) allows the authentication board (100) to persistently store data related to providing, enabling, and disabling features for a connected vehicle lift, including collecting, producing, or reporting data such as diagnostic information related to the use of the vehicle lift; software instructions for implementing additional features on the vehicle lift; or software configurations for enabling additional features on the vehicle lift.

The lift connection (104) is configured to couple the authentication module (100) with a vehicle lift to allow the exchange of data between the authentication module (100) and the vehicle lift and, in some implementations, to allow for electrical power to be provided from the vehicle lift to the authentication module (100) to operate electrical components, recharge the battery (102), or both. When the authentication module (100) is coupled with a vehicle lift via the lift connection (104), the authentication module (100) may provide data and instructions to the vehicle lift to enable or disable features of the vehicle lift.

The programmer connection (106) is configured to couple the authentication module (100) with a programmer to allow the exchange of programming instructions between the authentication module (100) and the programmer. Memory (112) or storage component (114) may be accessed by processor (110) to enable one or more features on a vehicle lift. This allows different feature sets to be provided to a user of the vehicle lift by providing differently configured authentication modules (100).

The battery (102) may be configured to provide primary or secondary power to one or more components of the authentication module (100). This could include, in addition to those uses already described above, providing power to the processor (110), the memory (112), and the real-time clock (116) when the authentication module (100) is connected to a vehicle lift, not connected to a vehicle lift, or both, as may be desirable for a particular implementation. Additionally, the battery (102) may be integrated and rechargeable, removable and replaceable, or removable and rechargeable as may be desired for a particular implementation.

The set of mounts (108) are shown as holes for fasteners which could be used to fasten the authentication module (100) to another device or support structure to allow for connection of the authentication module (100) to a vehicle lift via the lift connection (104). However, it should be understood that the set of mounts (108) may not be present at all in a given implementation, or could take a variety of forms, and could include magnetic, mechanical, adhesive, or other connections that will hold the authentication module (100) in place when installed.

Figure 3:
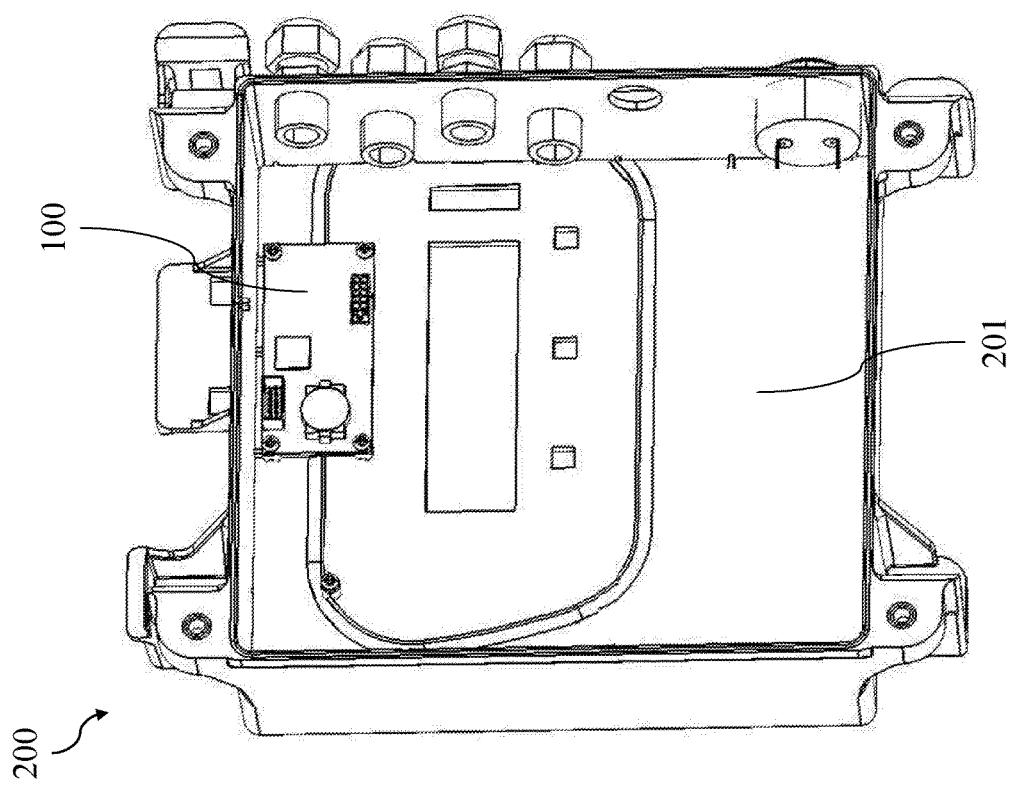
FIG. 3 shows a rear perspective view of an exemplary control case that the authentication module may be mounted within.
Figure 4:
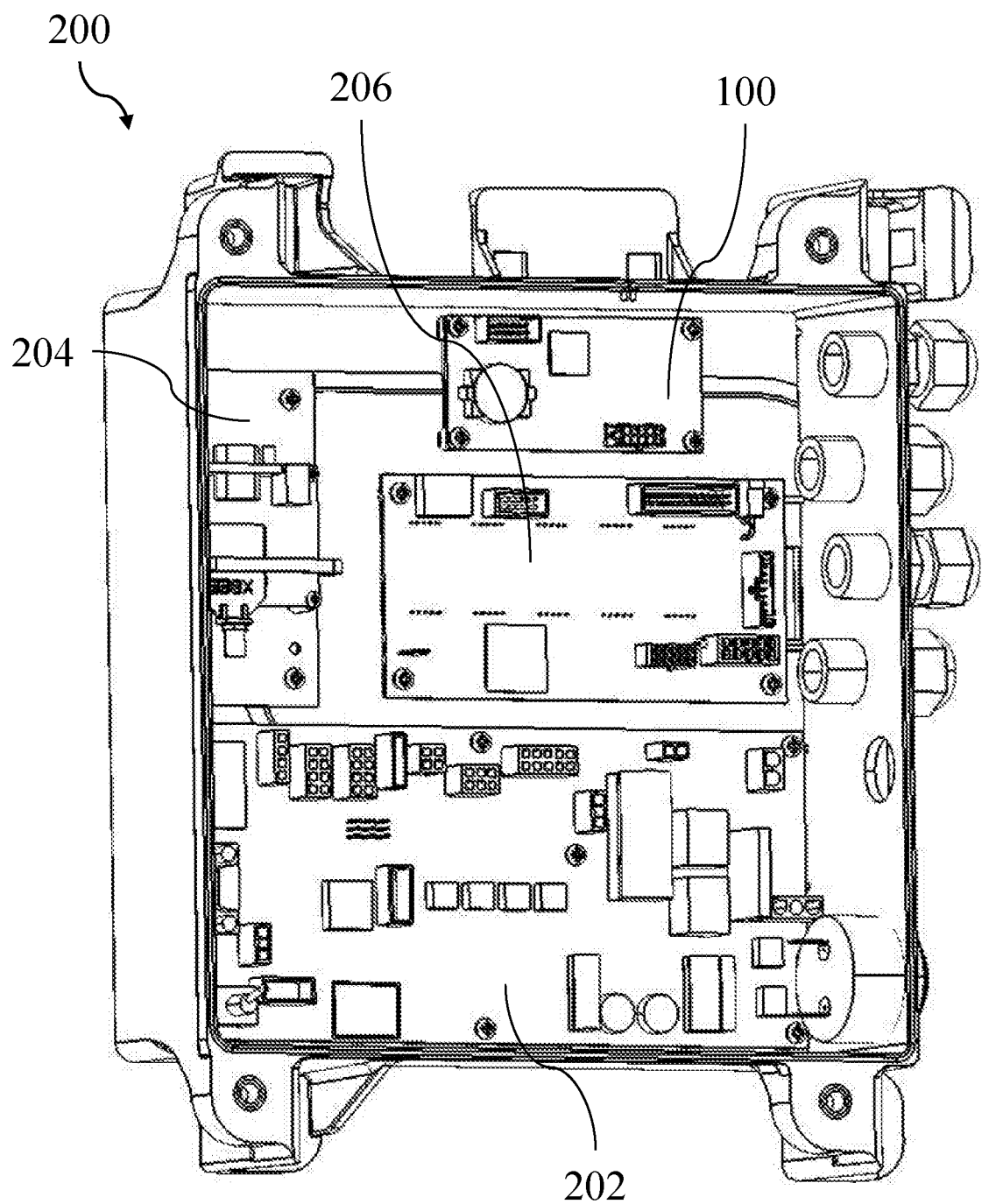
FIG. 4 shows a rear perspective view of the control case with additional components mounted within.
Figure 5:
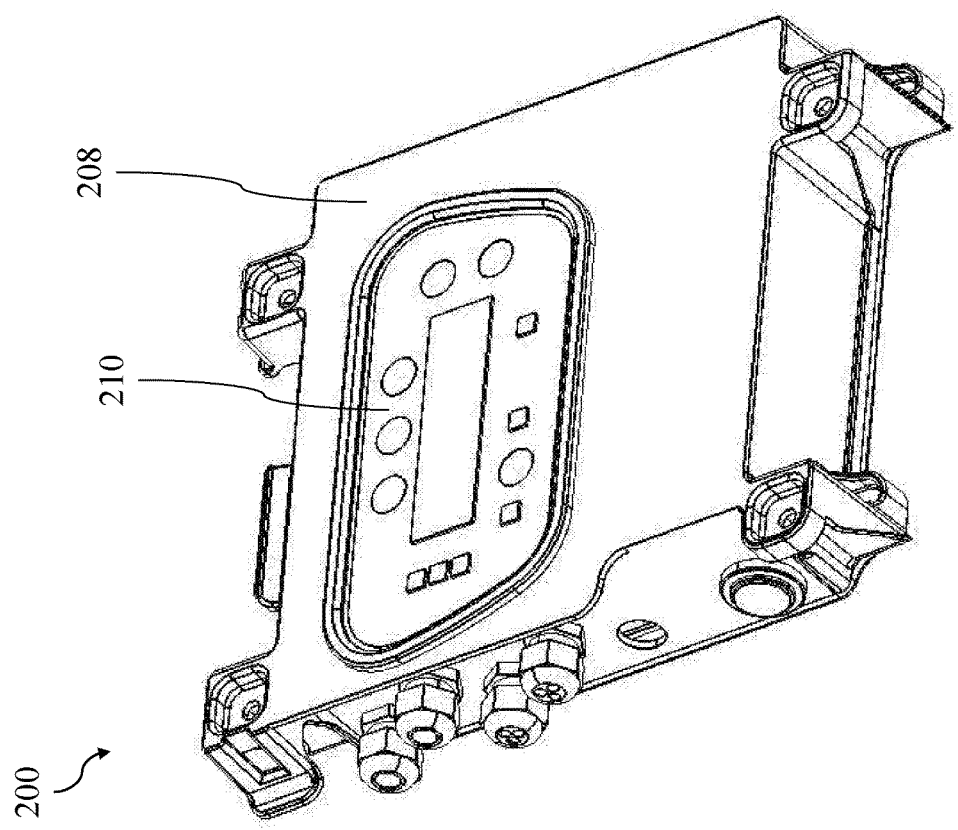
FIG. 5 shows a front perspective view of the control case fully assembled.
Figure 6:
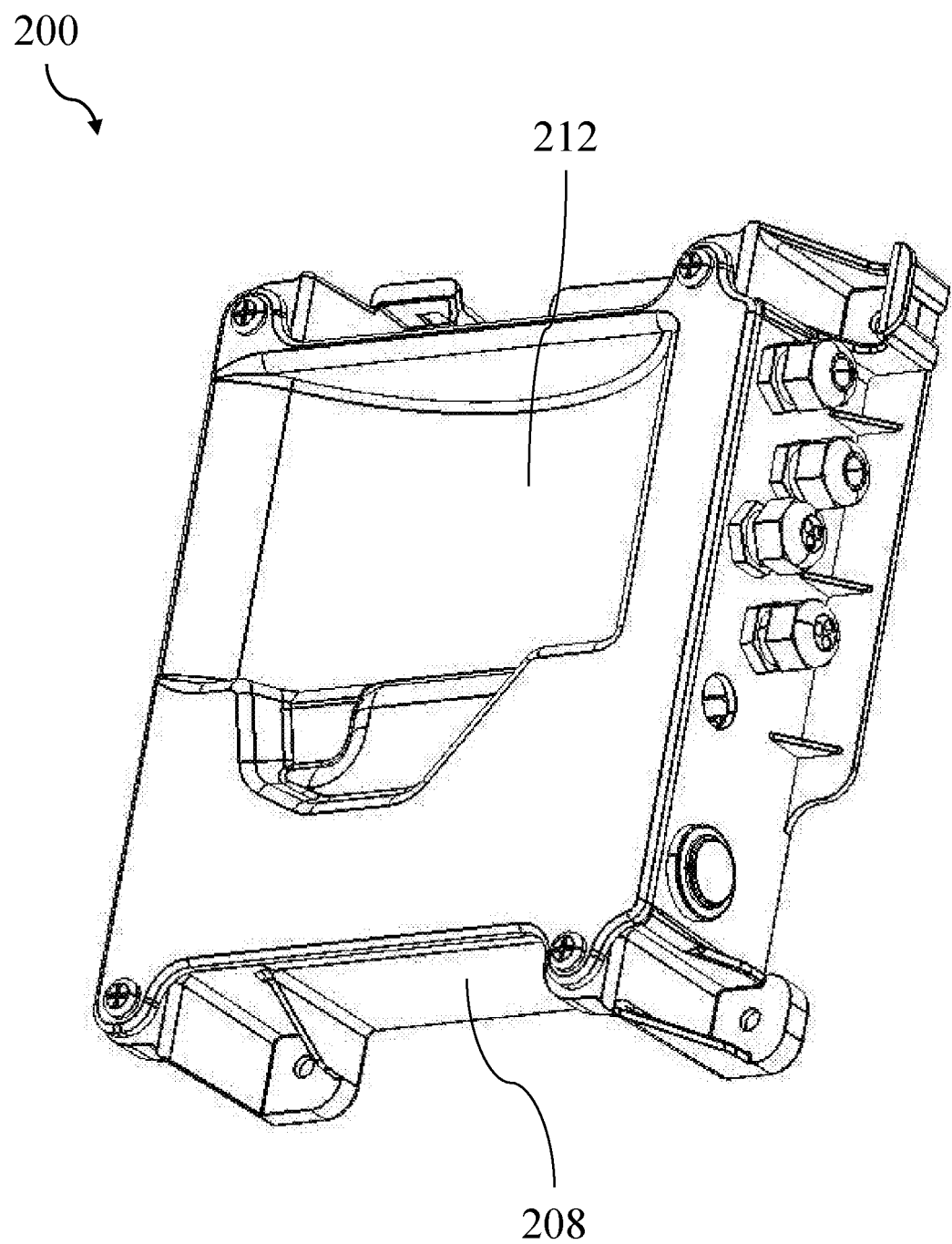
FIG. 6 shows a rear perspective view of the control case fully assembled.

FIGS. 3-4 show rear perspective views of an exemplary lift control (200) that the authentication module (100) may be mounted within, while FIGS. 5-6 show the lift control (200) fully assembled. The lift control (200) may be connected to the mechanical systems of a vehicle lift and provide a user interface that a user of the vehicle lift may interact with in order to cause movable portions of the lift to rise, lower, rotate, extend, retract, or otherwise move, and may also allow a user to configure, modify, or activate various characteristics and features of the vehicle lift. With reference to FIGS. 5 and 6, the lift control (200) comprises a case (208) and an interface (210) on a front side, and a cover (212) that may be attached to the case (208) on the rear side. In some alternative embodiments, authentication modules may be physically attached to—and in direct electrical communication with—other components of the lift control system, a control board, or other component of the lift system, while in others, authentication modules communicate wirelessly with the lift control system and may be placed anywhere that enables the communication.

When the cover (212) is removed from the case (208), an interior (201) of the lift control (200) is exposed in which one or more modules or components may be installed, including the authentication module (100), as can be seen in FIG. 3, while FIG. 4 shows the control case (200) with a lift control module (202), communication module (204), and interface module (206) also installed within the interior (201). The lift control module (202) is configured to provide electronic signals to the mechanical systems of a lift in order to cause movable portions of the lift to move in response to user inputs or other automatic processes. Communication module (204) may have one or more wired or wireless communication capabilities to allow the lift control (200) to communicate with other portions of the vehicle lift, to communicate with safety devices worn on users or placed around the vehicle lift, or to communicate with other networks, computer systems, or servers used with the vehicle lift. The interface module (206) is configured to receive inputs from users via buttons, keyboards, touch screens, or other input devices available on the interface (210) and is configured to provide information to a user via a display or other output device available on the interface (210).

The authentication module (100) may connect to one or more of the lift control module (202), the communication module (204), and the interface module (206) via the lift connection (104) in order to provide new or updated features or enable dormant features. In the shown embodiment, the various modules may be installed within the interior (201) of the lift control (200) and interconnected by cables or other connections to allow for the exchange of data, power, or both between modules. Once connected, the cover (212) may be attached to the case (208), and the lift control (200) may be mounted on a wall or other surface proximate to a vehicle lift to allow for connection to and control and/or use of the mechanical systems of the vehicle lift. The authentication module (100) may be installed and connected to the lift control (200) when received by a user prior to installation of the lift control (200), or it may be retrofitted into an already installed lift control (200) by accessing the interior (201), mounting the authentication board (100), and connecting the authentication board (100) to one or more other modules via the lift connection (104).

It should be understood that the embodiments of FIGS. 1-6 are examples only, and variations in the design, form, and arrangement of the described components exist and will be apparent to one of ordinary skill in the art in light of this disclosure. For example, in some implementations the authentication module (100) may instead be an external device that is connected to an external connection of the lift control (200) rather than installed within the interior (201). In some implementations, the lift connection (104) may have mechanical connections of different types or shapes, or may be wireless connections to a local Wi-Fi network or to a cellular network. In such cases where connectivity to a local or cellular network is available, new and updated feature software and configurations may be communicated to the authentication module (100) wirelessly. Similarly, where the communication module (204) is capable of reliably connecting to a local network or cellular network, the authentication module (100) itself may be unnecessary or entirely omitted while still allowing for new and updated features to be enabled on a vehicle lift using the methods disclosed herein.

Figure 7:
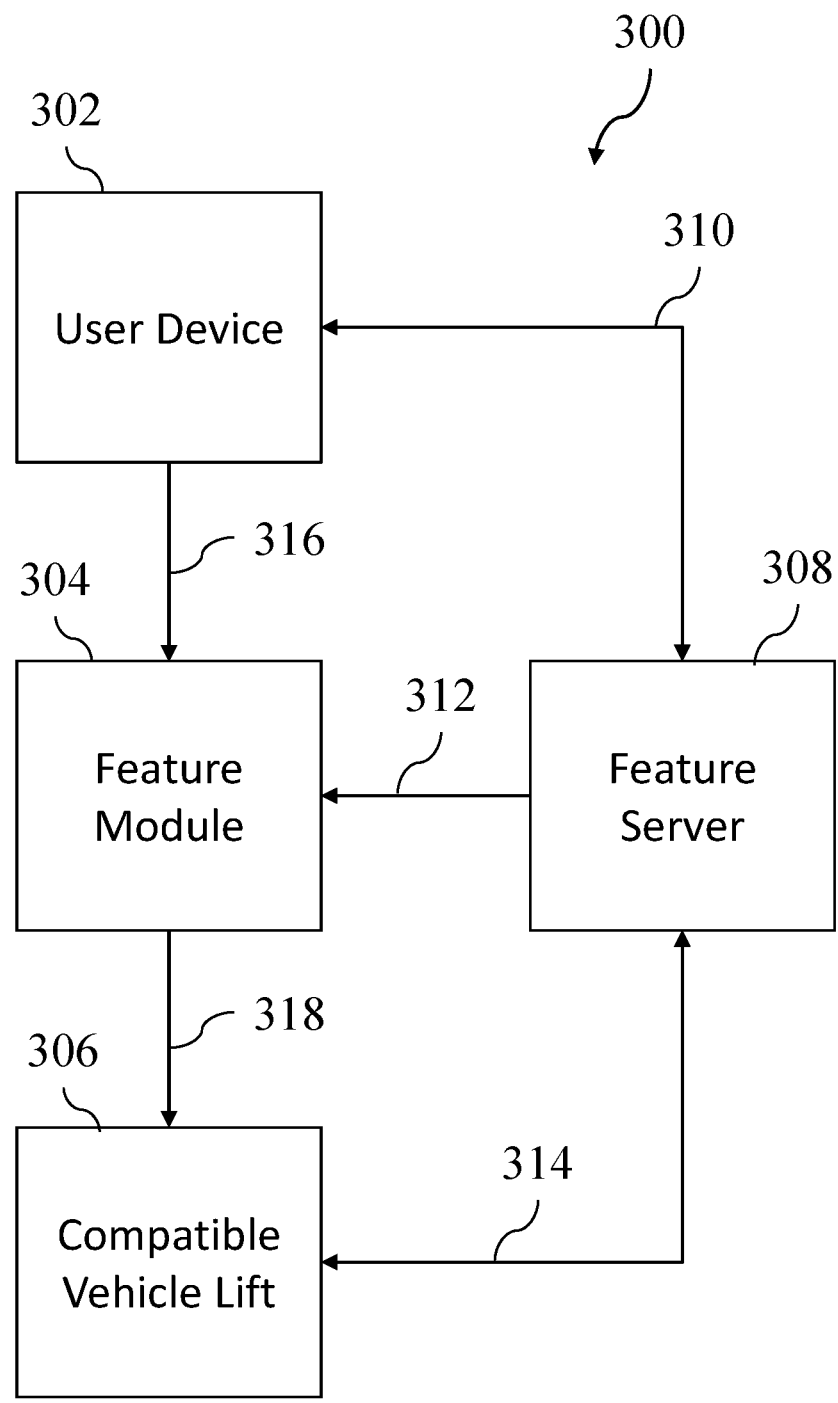
FIG. 7 shows a schematic diagram of an exemplary system usable to provide additional features to a vehicle lift.

Turning now to FIG. 7, an exemplary system (300) is usable to provide new or updated features to a compatible vehicle lift (306). The compatible vehicle lift (306) is a vehicle lift that has an installed authentication module such as the authentication module (100) or that does not have the authentication module (100) but is still capable of receiving software and software configurations to enable features (e.g., by an existing wireless or other communication device). A feature server (308) is configured to store information on vehicle lift types, models, and features, and is usable to determine the features that a particular vehicle lift (identified in various embodiments by a unique identifier as will occur to those skilled in the art) already has enabled, features that may be enabled on a particular vehicle lift, or both. A user device (302) may be a computer or mobile device configured to access the feature server (308) over the internet via a web browser or other software application (310) in order to view and request available features. In response to a request from a user device (302) or other device, or from time to time as part of software updates, the feature server (308) may generate software and software configurations that may be used by the compatible vehicle lift (306) in order to enable features. Software and software configurations for enabling features may be delivered to the compatible vehicle lift (306) in varying ways.

As one example, if the compatible vehicle lift (306) is capable of communicating with an internet-connected local network or cellular network (e.g., where the authentication module (100) is wirelessly connected to a network, or where the communication module (204) is physically or wirelessly connected to a network), the compatible vehicle lift (306) may communicate directly (314) with the feature server (308). In this example, features could be automatically delivered from the feature server (308) directly to the compatible vehicle lift (306), and features could be requested via the interface module (206) instead of or in addition the user device (302).

As another example, if the compatible vehicle lift (306) includes an authentication module (100), the feature may be copied or otherwise transmitted (312) to an authentication module (304). In this example, features could be requested via the user device (302), produced by the feature server (308) and copied to the authentication module (304), then the authentication module (304) may be provided to a user to install on the compatible vehicle lift (306).

As another example, after being requested via the user device (302), the feature server (308) may provide the feature to the user device (302), which may then be coupled (316) with the authentication module (304) directly or via an adapter in order to copy the feature from the user device (302) to the authentication module (304), so that the authentication module (304) may then be installed on the compatible vehicle lift (306). An implementation of the disclosed technology could be capable of each of the above examples or only a subset of the above examples, and could also be capable of variations of the above examples, as will be desirable for that particular implementation.

Figure 8:
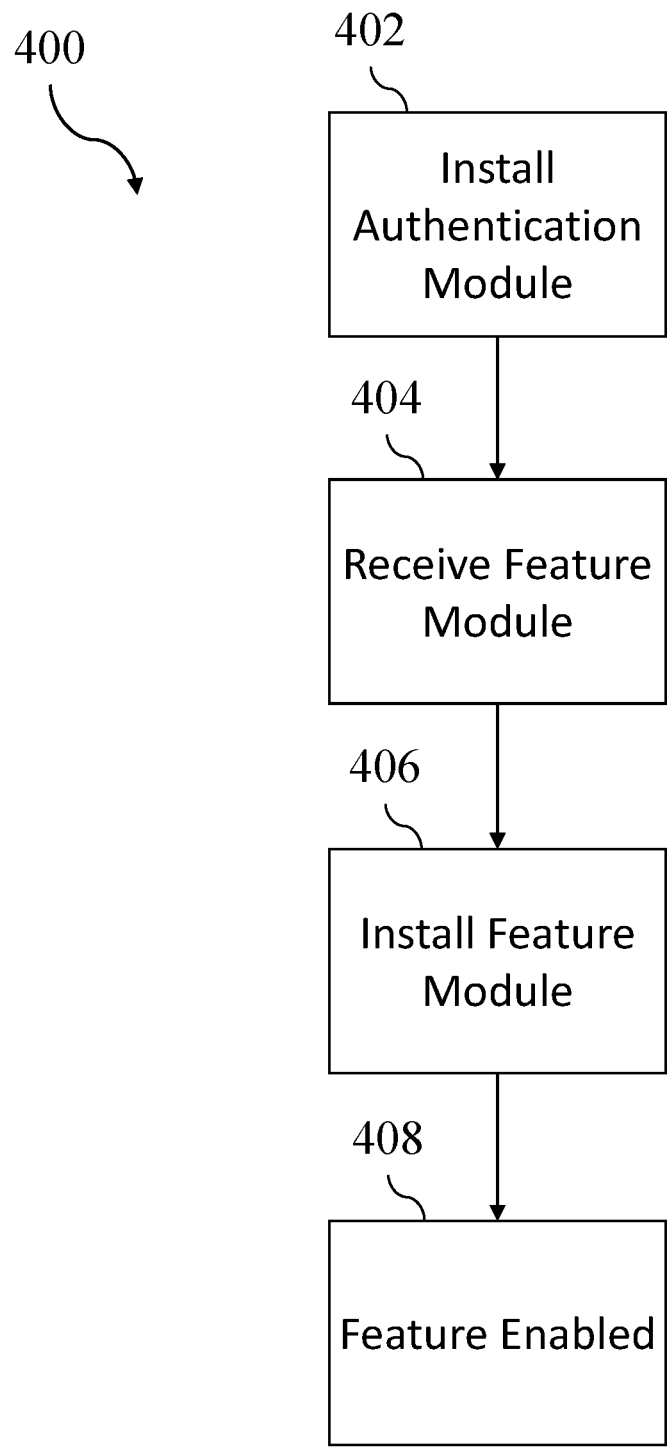
FIG. 8 shows a set of exemplary high-level steps that may be performed to provide additional features to a vehicle lift.
Figure 9:
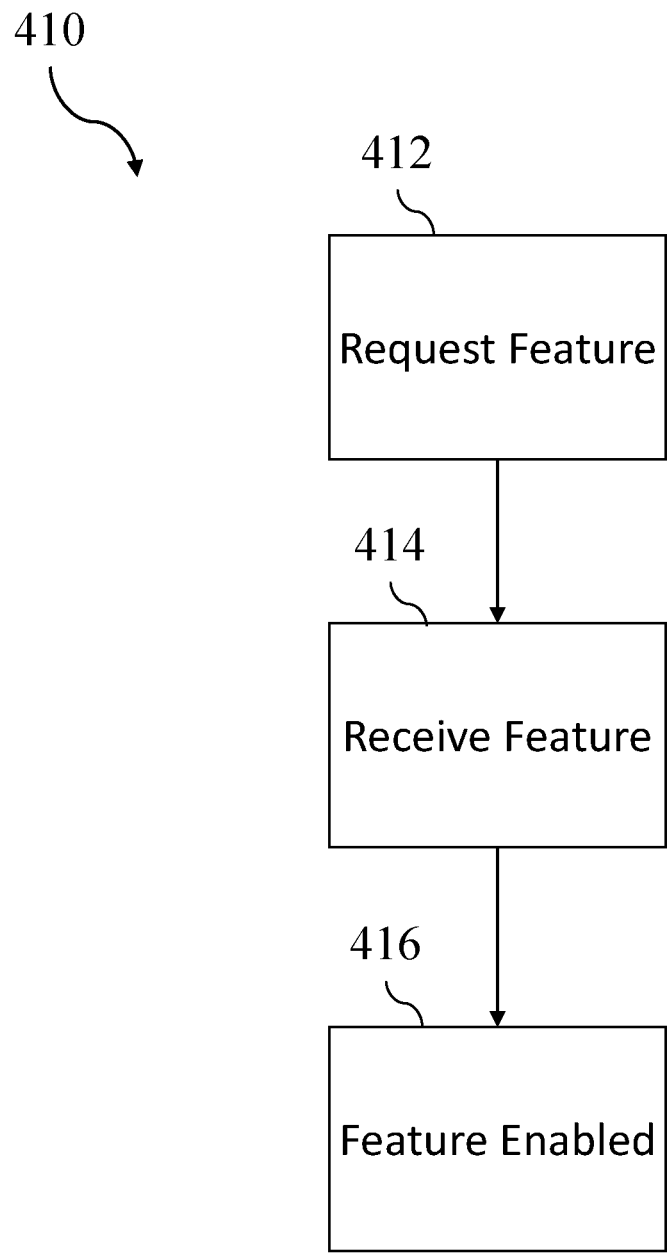
FIG. 9 shows an alternate set of exemplary high-level steps that may be performed to provide additional features to a vehicle lift.

FIGS. 8-16 show exemplary steps that may be performed with or by a system such as the system (300), or a variation on such a system as has been described, or that will be apparent to a person of ordinary skill in the art in light of this disclosure. FIGS. 8-9 show high-level examples of processes performed by and with the system (300), while FIGS. 10-16 show more detailed steps. In particular, FIG. 8 shows a set of exemplary high-level steps (400) that may be performed to provide additional features to a vehicle lift using a device such as the authentication module (100). An authentication module, such as the authentication module (100), may be installed (402) on a vehicle lift, and the feature existing on the authentication module (100) will enable (408) the feature for the vehicle lift. While this process requires a relatively high amount of manual intervention and installation, it advantageously allows the disclosed technology to be retrofitted into existing hardware and installations due to its relatively low requirement for connectivity and capabilities of the system (300).

Figure 10:
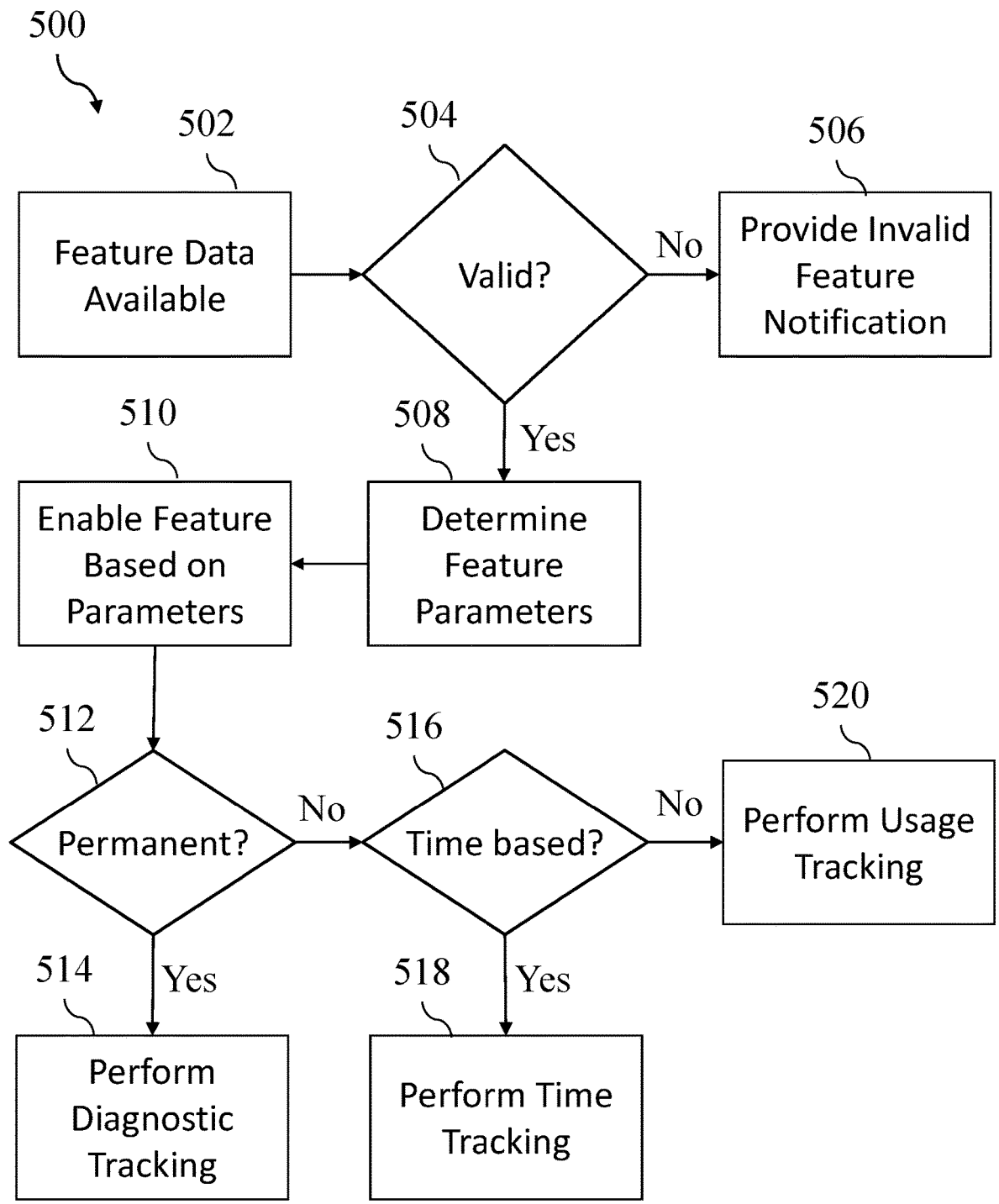
FIG. 10 shows a set of exemplary steps that may be performed to enable features of a vehicle lift.

Similar to FIG. 8, FIG. 9 shows an alternate set of exemplary high-level steps (410) that may be performed to provide additional features to a vehicle lift capable of receiving a feature. This could include, for example, where the compatible vehicle lift (306) is capable of direct communication with the feature server (308). A feature may be requested (412) via the user device (302) or the compatible vehicle lift (306), and the relevant software and/or configuration(s) be received (414) from the feature server (308) by the compatible vehicle lift (306), causing the requested feature to be enabled (416). While this process provides some advantages over others, it does have a relatively high requirement for connectivity and capabilities of the system (300), and may not be ideal for retrofitting the disclosed technology into existing hardware or installations. In still other embodiments, FIG. 10 shows a set of exemplary steps (500) that may be performed to enable features provided to a vehicle lift, and may in some implementations correspond to more detailed descriptions of a step of enabling (408, 416) features that has been mentioned above. For the sake of clarity, these steps will be described with reference to FIG. 8 (i.e., a system using the authentication module (100)), but it should be understood that they can be applied to any implementation of the system (300). When feature data becomes available (502) to the authentication module (100), for example the authentication module (100) will determine whether the feature is valid (504). Feature validation will be discussed in more detail below, but may include steps such as analyzing unique hardware identifiers, unique software identifiers, unique configurations, encrypting and decrypting data using encryption keys or other algorithms, and other similar steps that ensure that the correct feature has been provided, and that the provided feature and feature process has not been tampered with or otherwise modified for an unintended or unauthorized use. Where the feature is not valid (504), the feature will not be enabled, and an invalid feature notification will be provided (506) via the lift control (200) interface (210). A determination of whether the feature is valid (504) may also occur at one or more times other than initial installation, such as each time the feature is used or activated, each time the vehicle lift is powered on, or upon set time intervals (e.g., every five minutes, ten minutes, fifteen minutes, etc.).

Where the feature is valid (504), the authentication module (100) will determine (508) the feature parameters, which may include, for example, the exact feature or features that should be configured or otherwise enabled, and the characteristics or limitations on use, if any, associated with those features. The authentication module (100) may then enable (510) the feature or features based on the parameters, which may include transmitting data or another electronic signal to the lift control module (202) or interface module (206) to install or change stored software or configurations. Depending upon the determined (508) parameters of the enabled feature or features, the authentication module (100) may then begin to track or maintain data related to the use and usability of the features.

As an example, if the enabled (510) feature has parameters indicating that it is permanently enabled (512), the authentication module (100) might only perform diagnostic tracking (514) of the use of the vehicle lift, its features, and the enabled feature. This could include, for example, tracking the total time the vehicle lift is in use, the total time any electrically movable component of the vehicle lift is in motion, temperatures of mechanical and electrical components of the vehicle lift during use as reported by sensors of those systems, and other information that may advantageously be used by a user or vehicle lift manufacturer to monitor, maintain, or improve the vehicle lift.

If the enabled (510) feature has parameters indicating that it is enabled (516) on a time basis, the authentication module (100) may perform time tracking (518) of the use of the vehicle lift and its features. This could include, for example, tracking the passage of time since the feature was first made available to the vehicle lift, the total time the vehicle lift is in use, the total time any electrically movable component of the vehicle lift is in motion, or other similar metrics. Such information could be tracked collectively for a number of features, or individually for each feature. Once the relevant measure of time has passed, the feature may be automatically disabled.

If the enabled feature has parameters indicating that it is enabled on a usage tracking basis, the authentication module (100) may perform usage tracking (520) of the use of the vehicle lift and its features. This could include, for example, tracking the total number of times that a certain feature is activated, the total number of times a certain component is moved (e.g., the number of times the vehicle lift raises), the number of vehicles the vehicle lift is used with, or other similar metrics. Tracked information and metrics may be used to improve and maintain vehicle lift hardware and software, to diagnose errors or fault conditions of associated lifts, to validate features and ensure they are still properly enabled, and to disable a feature after its authorized or intended use has expired or otherwise been exhausted.

While various types of tracking have been mentioned in the context of different feature permission strategies, those skilled in the art will appreciate that any of the these types of tracking might be applied in the context of any permission scheme. For example, diagnostic tracking (514) discussed above in the context of permanent feature activation could be implemented where time-based or usage-based authorization has occurred. Likewise, time tracking (518) discussed above in the context of time-based authorization could be implemented where permanent or usage-based authorization has occurred. Still other combinations of authorization and tracking techniques will occur to those skilled in the art in view of this disclosure.

Figure 11:
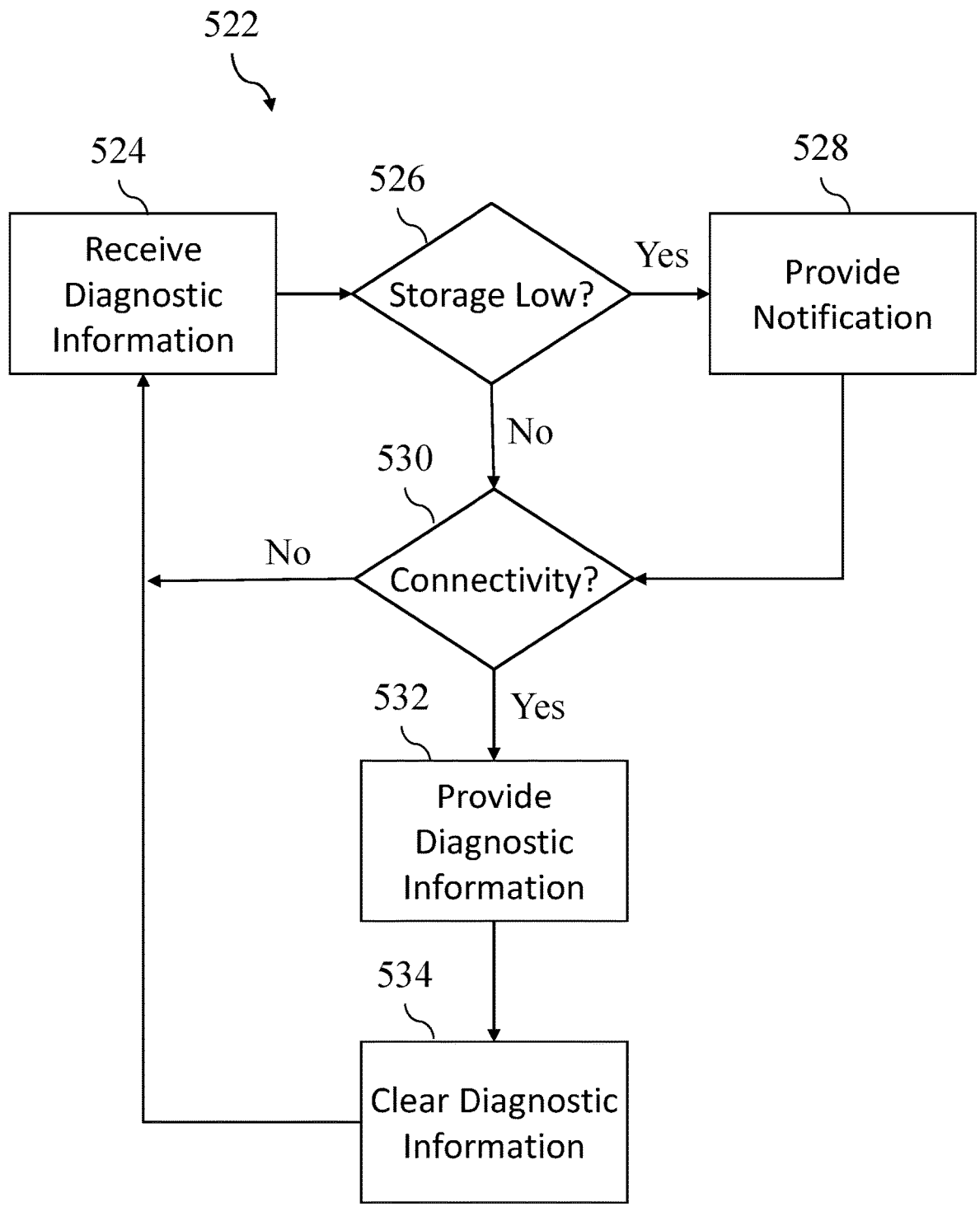
FIG. 11 shows a set of exemplary steps that may be performed to gather diagnostic information from a vehicle lift.

FIG. 11 shows a set of exemplary steps (522) that may be performed to gather diagnostic information from a vehicle lift, and in some implementations may be performed as part of diagnostic information tracking (514). As with prior examples, for clarity the discussion of FIGS. 11-16 will assume the presence of the authentication module (100), but the disclosed principles can be applied to other variations of the system (300). Diagnostic information may be received (524) from other electrical or mechanical components of a vehicle lift, such as the lift control module (202), interface module (206), electrical motors, and electrical actuators. Received (524) diagnostics may be stored on one or more of the storage component (114) of the authentication module (100) or another attached storage device, and may be stored in a raw format or manipulated and stored in a new format as may be desirable. If the authentication module (100) determines that storage is low (526), the authentication module (100) may provide (528) a notification via the lift control (200) interface (210) indicating that stored diagnostic information is nearing capacity.

When the authentication module (100) has connectivity (530) to a local or cellular network available, the diagnostic information may be provided (532) to another device or party for review, use, or continued storage. The diagnostic information may then be cleared (534) in order to free up additional storage for diagnostic information on the authentication module (100) on which it was stored.

As an example, if diagnostic information is saved to the authentication module (100) during use of the vehicle lift, a user may from time to time, or in response to a provided (528) notification of low storage, remove the authentication module (100) and exchange it for a new authentication module (100), or attach it to the user device (302) or another device so that the stored data may be accessed (530), checked, transferred to a different device, and/or deleted. The user may use such data to review the performance and condition of the associated vehicle lift, or it may be manually or automatically transmitted to a remote server such as the feature server (308) for manual or automated analysis.

As another example, if diagnostic information is saved to the authentication module (100) during use of the vehicle lift, a user may from time to time, or in response to a provided (528) notification of low storage, connect the vehicle lift to a local network or cellular network, connect the vehicle lift to a device having a shareable connection to a local network or cellular network, or otherwise provide connectivity (530) so that the stored data may be transmitted to the user device (302) or feature server (308) for further review.

With various ways to provide connectivity (530) between the device on which the diagnostic information is stored and other devices, the steps of FIG. 11 advantageously provide additional diagnostic tracking features to the vehicle lift without setting stringent requirements for internet connectivity or hardware disassembly and reassembly. Other variations on the above examples exist and will be apparent to one of ordinary skill in the art in light of this disclosure.

Figure 12:
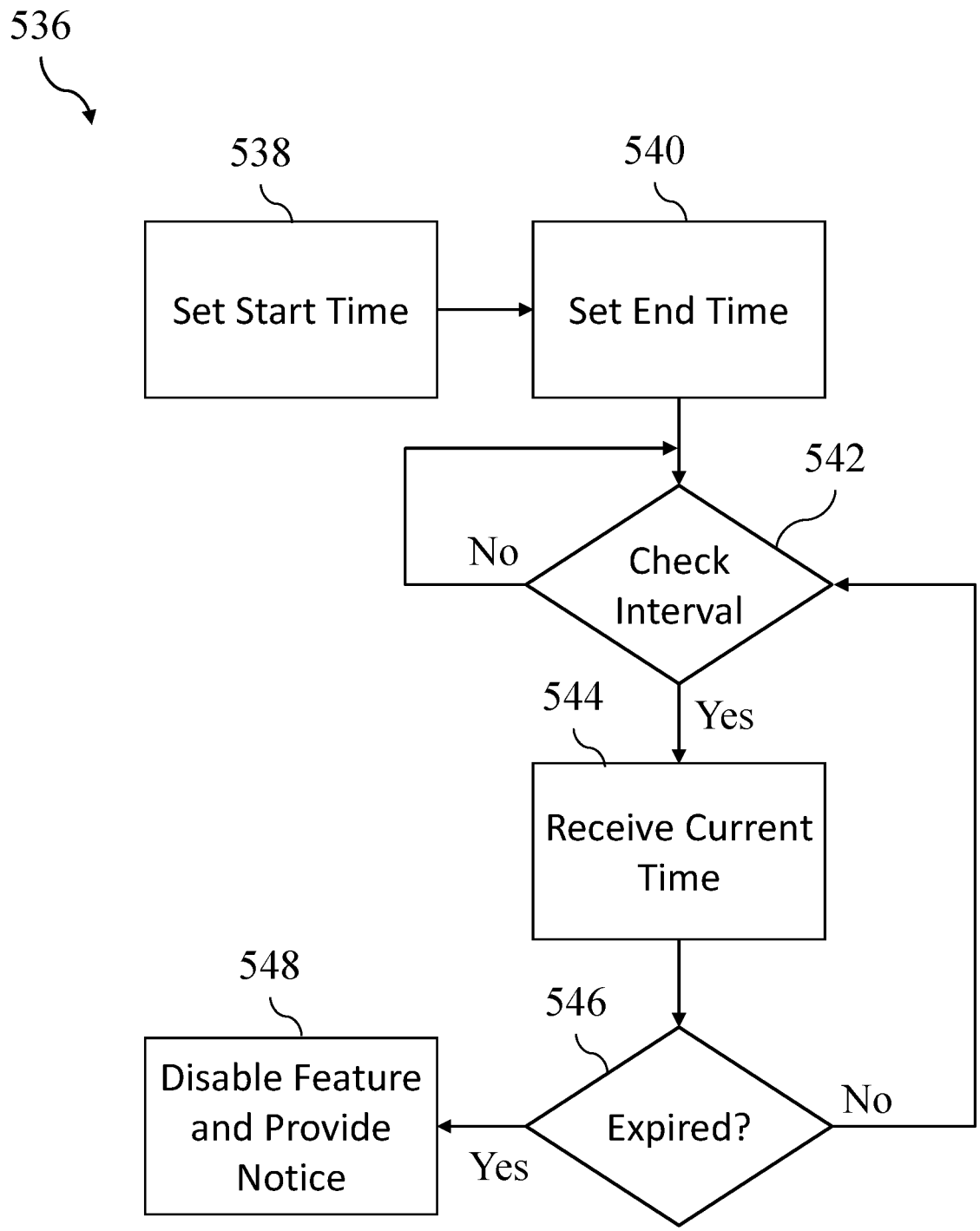
FIG. 12 shows a set of exemplary steps that may be performed to disable a feature based upon an elapsed time.

FIG. 12 shows a set of exemplary steps (536) that may be performed to disable a feature based upon an elapsed time, and may in some implementations be performed as part of time tracking (518). The authentication module (100) may set (538) a start time for a feature when that feature is first enabled or otherwise becomes available by recording a current time from the real-time clock (116), associating that time with that feature, and storing that association on one or more of the authentication module (100). The authentication module (100) may also set (540) an end time for the feature, based upon the feature parameters, that may be used in conjunction with the start time to determine when the enabled features has expired. Examples of the above could include where the feature parameters indicate that it should be available for one year, the start time indicates the start of that year, and the end time indicates a time that is 365 days from the start time. Such times could be stored in various formats including as calendar dates relative to a calendar date of the start time, or as one or more of hours, minutes, and seconds elapsed from a particular start time. Such times may also be stored as one or more of hours, minutes, or seconds indicating the amount of time that a particular feature or component has been in use from a start time of zero. As has been mentioned, since the authentication module (100) has a real-time clock (116) it can continue to track the passage of time even in the absence of and external power supply.

Whenever a check interval occurs (542), the authentication module (100) may receive (544) a current time indicator from the real-time clock (116) and compare the current time to one or more of the start time or the end time in order to determine if the feature has expired (546) based upon the elapsed time since its first use, or the total time of its use. If the feature has not yet expired (546), it will remain enabled for future interval checks (542). If the feature has expired (546), the authentication module (100) may disable (548) the feature and provide a notification via the lift control (200) interface (210) that the feature is no longer enabled. The authentication module (100) may also perform other steps to ensure the feature is disabled, including deleting software, software configurations, or other data associated with the feature in order to prevent manipulation or unintended use.

Figure 13:
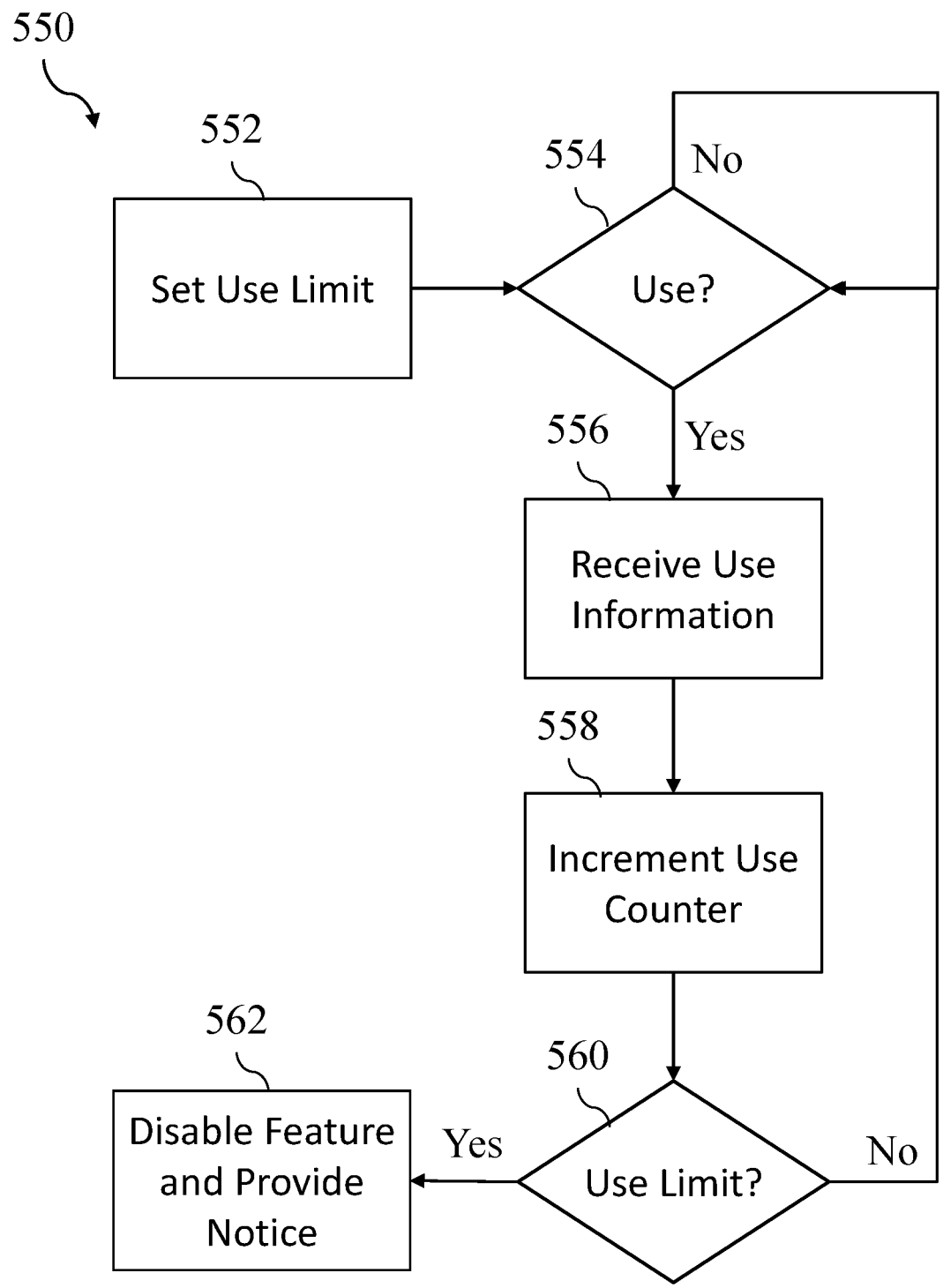
FIG. 13 shows a set of exemplary steps that may be performed to disable a feature based upon a number of uses.

FIG. 13 shows a set of exemplary steps (550) that may be performed to disable a feature based upon a number of uses, and may in some implementations be performed as part of use tracking (520). The authentication module (100) may set (552) a use limit when the feature first becomes available. When the vehicle lift is in use (554) the authentication module (100) may receive (556) use information and data (e.g., from another module of the lift control (200)) indicating that a feature or component of the vehicle lift is in use (554). Received (556) data may be used to increment (558) any usage counters associated with the used features or components. If, after incrementing (558) a use counter or other tracker, a comparison of the counters to the set (552) use limits indicates that the use of the feature or component has reached its limit (560) and is exhausted, the authentication module (100) may disable (548) the feature and provide a notification via the lift control (200) interface (210) that the feature is no longer enabled. The authentication module (100) may also perform other steps to ensure the feature is disabled, including deleting software, software configurations, or other data associated with the feature in order to prevent manipulation or unintended use.

Use limitations may be configured in various ways within the feature parameters, and may include, for example, a usage limit associated with a number of vehicles services with the vehicle lift. As a vehicle service is initially identified or registered with the vehicle lift, data may be received (556) by the authentication module indicating the use. After a set number of vehicles have been serviced with the lift and the use limit is reached (560), the feature may be disabled.

Usage limits may also be configured in ways not associated with vehicles, such as a usage limit for a feature that allows a lift to automatically return to a home position at an accelerated rate that may exceed the ideal operational speed of one or more electrical motors. In order to ensure such a feature is not overused without regular maintenance of the vehicle lift, a counter may increment (558) each time it is used, such that the feature will eventually be disabled (562) until the electric motors can be inspected or serviced and the feature can be re-enabled. Other examples of use limits configurations exist and will be apparent to one of ordinary skill in the art in light of this disclosure.

Figure 14:
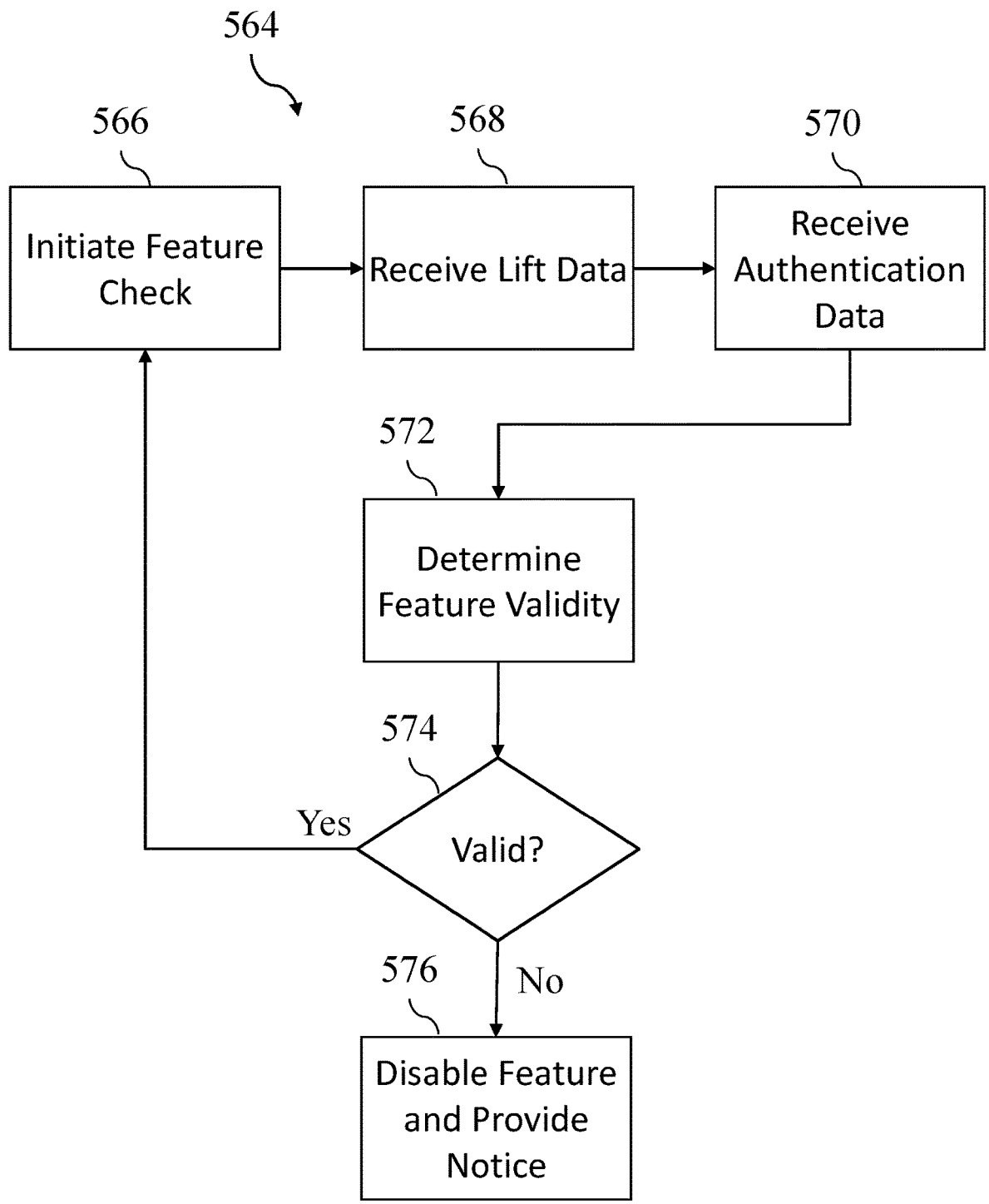
FIG. 14 shows a set of exemplary steps that may be performed to disable a feature based upon a determination that it is invalid.

FIG. 14 shows a set of exemplary steps (564) that may be performed to disable or leave disabled a feature based upon a determination that it is invalid, and may in some implementations be performed as part of determining whether the feature is valid (504). When a feature validity check is initiated (566), the authentication module (100) may access or otherwise receive (568) a set of lift data from one or more modules of the lift control (200). Such data may include unique hardware identifiers, unique software identifiers, security codes or challenges, and other information that may be useful in combination with other data for verifying the identity, status, or feature authorization for a particular vehicle lift and a particular feature. The authentication module (100) may also access and receive (570) a set of authorization data that may be stored on one or more of the storage component (114), the memory (112), or another attached storage device. The set of authorization data may also contain unique hardware identifiers, unique software identifiers, security codes or challenges, and other information that may be useful in combination with the set of lift data for verifying the identity, status, or feature authorization for a particular vehicle lift and a particular feature.

The set of lift data and the set of authorization data may be stored in their respective storage locations in encrypted forms, with additional data integrity features such as mirrored storage, checksum validation, and various types of key authentication and verification to mitigate risks associated with the data becoming corrupted or being maliciously modified. One or more of the data sets may also be stored in a manner that makes it impossible or difficult to access without first possessing data that is contained in the other data set. When the authentication module (100) possesses both the set of lift and the set of authorization data in an unencrypted, usable form, it may determine (572) the validity of a feature associated with that data by applying an algorithm or process to the data that requires each set of data be complete and unmodified in order to provide an indication that the feature is valid. Where the feature is determined to be valid (574), the feature will be enabled or remain enabled. Where the feature is determined be invalid (574), which may occur where data from the set of lift data or the set of authorization data is missing, corrupted, intentionally modified or changed, or otherwise unusable or unavailable, the authentication module (100) may disable (576) the associated feature and provide notice via the lift control (200) interface (210).

Figure 15:
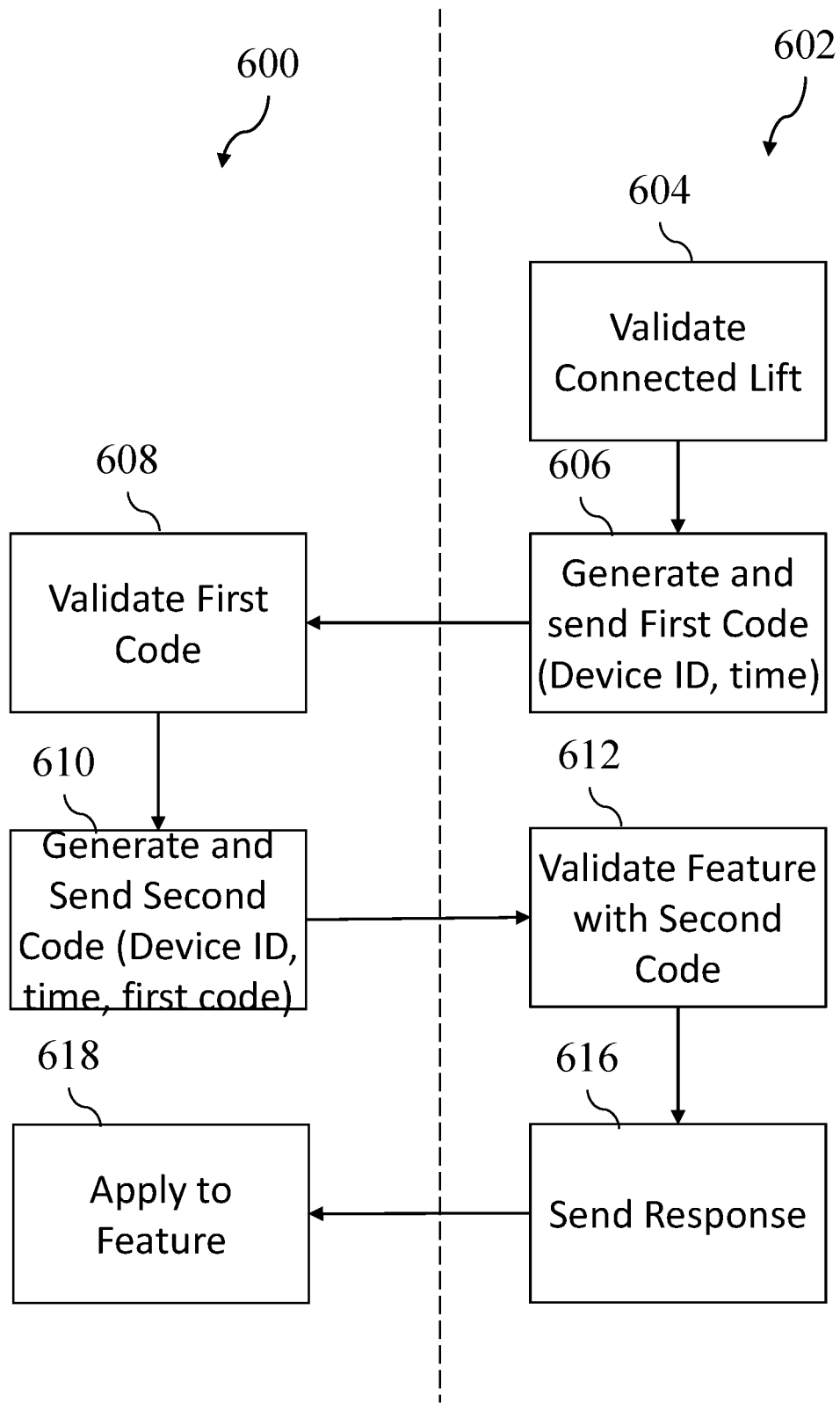
FIG. 15 shows a set of exemplary steps that may be performed to determine the validity of a feature.
Figure 16:
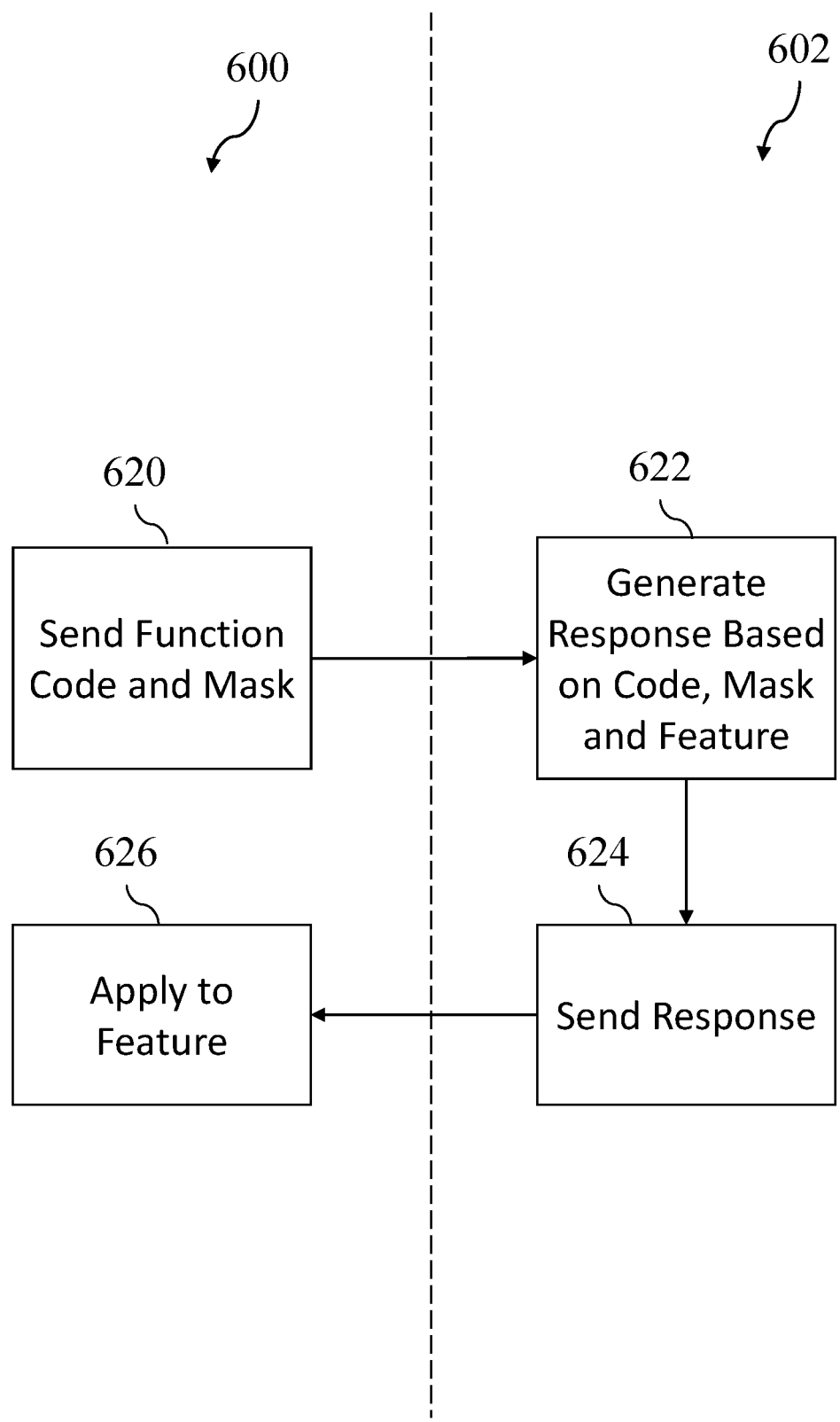
FIG. 16 shows an alternate set of exemplary steps that may be performed to determine the validity of a feature.

FIGS. 15 and 16 show exemplary steps that may be performed to combine data from the modules of the lift control (200) and the authentication module (100) in order to verify the validity of a particular feature, and one or more of the steps may be performed as part of determining (572) feature validity. Steps performed on the left side (600) of the dotted line may be performed by or on a first device (e.g., the interface module (206) or another module), while steps on the right side (602) of the dotted line may be performed by or on a second device (e.g., the authentication module (100)).

With reference to FIG. 15, the authentication module (100) may validate (604) the device that it is coupled with via the lift connection (104). This could include analyzing data (e.g., a unique hardware or software identifier) received from the attached lift as part of exchanged data, the electrical characteristics (e.g., frequency, voltage, current) of signals received from the attached lift, or other information to verify that the attached device is not being spoofed and that there are no other devices or connections between. This may prevent malicious behavior or use of the authentication module (100) that is intended to gain unauthorized access to the set of lift data, the set of authorization data, or other software and feature data.

The authentication module (100) may then generate (606) and send a first code to the connected device. The first code may contain a combination of pseudorandom data (e.g., output from a time-seeded pseudorandom number generator) and verification data, and may be encrypted such that a decryption key and knowledge of the pseudorandom data may be required to decrypt the first code. The attached device may receive and validate (608) the first code if it is an authorized vehicle lift whose interface module (206) or other module contains knowledge of the pseudorandom data and the decryption key. Once validated (608), the attached device may generate (610) and send in response a second code using the same or similar principles used to generate the first code, and may additionally add the decrypted first code. The second code may be encrypted and sent back to the authentication module (100), which can validate (612) the second code using the same principles and its prior knowledge of the first code. Once validated (612), the authentication module (100) may send (616) a response to the attached device indicating that the feature is valid, and the attached device may apply (618) any needed change to the availability of the feature. Any failure of validation, whether due to missing, incomplete, unexpected, unencryptable, or otherwise unusable data, may result in one or more additional attempts to validate the feature, or may immediately result in an invalid feature determination, which may cause the feature to be disabled as has been described above.

With reference to FIG. 16, an alternate set of steps is shown that may be performed in addition to or instead of those of FIG. 15 or any other method of validation. The interface module (206) or other module of the lift control (200) may, upon a set schedule or the occurrence of other events as has been described, send (620) a function code and a random mask to the authentication module (100). The authentication module (100) may apply a multi-input verification algorithm to generate (622) a response, using the received function code, random mask, and a unique feature key stored on the storage component (114) or another attached storage device as inputs. The response may be sent (624) back to the interface module (206) and applied (626) by the interface module (206) to enable or disable a feature, and to provide a notification via the interface (210) of the status of the feature.

It should be understood that any one or more of the teachings, expressions, embodiments, examples, etc. described herein may be combined with any one or more of the other teachings, expressions, embodiments, examples, etc. that are described herein. The described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. An apparatus comprising:
   an authentication module configured to be installed on a lift control of a vehicle lift, the authentication module comprising a processor and a memory;
   wherein the authentication module is configured to:
   (i) store a set of authorization data that is inaccessible by the lift control, wherein the set of authorization data comprises a unique authentication module identifier associated with the authentication module;
   (ii) receive a set of lift data from the lift control, wherein the set of lift data comprises a unique lift control identifier associated with the lift control;
   (iii) identify a set of feature data that comprises a unique feature identifier and is usable by the lift control to enable a feature of the vehicle lift;
   (iv) verify the set of feature data as a function of the authentication module identifier and the lift control identifier to yield a verification result;
   (v) cause the lift control to enable the use of the feature of the vehicle lift as a function of the verification result;
   (vi) prior to causing the lift control to enable the use of the feature, receive an electrical signal from the lift control and compare characteristics of the electrical signal to an expected electrical signal to determine whether an unexpected device is connected between the lift control and the authentication module; and
   (vii) if it is determined that an unexpected device is connected, prevent the lift control from enabling the use of the feature.

2. The apparatus of claim 1, wherein the authentication module is further configured to receive output from the lift control and store a set of metrics on a storage component, where a metric in the set of metrics is based at least in part upon the output from the lift control.

3. The apparatus of claim 2, wherein:
   (a) the authentication module is adapted to be placed within a case of the lift control and put into communication with a control module of the lift control; and
   (b) the storage component is part of the memory.

4. The apparatus of claim 1, wherein:
   (a) the set of authorization data comprises a unique feature key;
   (b) the set of lift data comprises a function code, wherein the function code comprises data that corresponds to the unique feature key for purposes of verification; and
   (c) the feature comprises one or more of:
      (i) a safety feature usable with the vehicle lift;
      (ii) a movement feature usable with the vehicle lift; and
      (iii) an instructional feature usable with the vehicle lift.

5. The apparatus of claim 2, wherein the set of metrics describes prior uses of the vehicle lift via the lift control and comprises a set of sensor data from sensors placed on one or more components of the vehicle lift.

6. The apparatus of claim 5, wherein the authentication module is configured to automatically transmit the set of metrics to a remote computer when a network connection is detected, and delete the set of metrics after transmission.

7. The apparatus of claim 2, wherein
   the authentication module further comprises a real-time clock operable to track the passage of time without an external power source, and
   the set of metrics stored by the authentication module comprises a set of time tracking information created using the real-time clock and associated with an authorized period of availability of the feature on the vehicle lift.

8. The apparatus of claim 7, wherein the authentication module is configured to:
   (a) determine whether the period of availability has expired as a function of the time tracking information; and
   (b) when the availability has expired, cause the lift control to disable the use of the feature with the vehicle lift.

9. The apparatus of claim 2, wherein the set of metrics stored by the authentication module comprises a set of usage tracking information associated with a feature use limit for the feature, the set of usage tracking information comprising a use counter associated with uses of the feature.

10. The apparatus of claim 9, wherein the authentication module is configured to:
   (a) determine whether the feature use limit has been met as a function of the set of usage tracking information; and
   (b) when the feature use limit has been met, cause the lift control to disable the use of the feature with the vehicle lift.

11. The apparatus of claim 1, wherein
the set of authorization data comprises one or more unique feature keys each associated with a particular feature of the vehicle lift; and
the authentication module is configured to, as part of verifying the set of feature data, perform a feature validation that will cause the authentication module to:
(a) select a unique feature key from the one or more unique feature keys, where a selected feature is the particular feature associated with the selected unique feature key;
(b) select a lift code from the set of lift data received from the lift control, where the lift code comprises data that during validation corresponds to the selected unique feature key;
(c) transform the lift code as a function of the unique feature key and a validation algorithm to produce a validity result, where the validity result indicates that the selected feature is either valid or invalid; and
(d) when the validity result indicates the selected feature is invalid, cause the lift control to disable the use of the selected feature with the vehicle lift.

12. The apparatus of claim 11, wherein:
(a) the lift code comprises a random mask and a function code;
(b) a set of inputs provided to the validation algorithm comprises the random mask, the function code, and the unique feature key; and
(c) the validity result indicates the selected feature is invalid when the unique feature key is unable to separate the function code from the random mask.

13. A method for providing a new feature to a vehicle lift comprising the steps:
(a) installing an authentication module on a lift control of a vehicle lift, wherein the authentication module comprises a set of feature data that includes a unique feature identifier and a set of authorization data that includes a unique authentication module identifier associated with the authentication module, and wherein the set of authorization data is inaccessible by the lift control;
(b) receiving a set of lift data from the lift control, wherein the received set of lift data includes a unique lift control identifier associated with the lift control;
(c) identifying at least a portion of the set of feature data that is usable by the lift control to enable a selected feature of the vehicle lift;
(d) verifying the portion of the set of feature data as a function of the set of authorization data and the set of lift data;
(e) causing the lift control to enable the use of the selected feature with the vehicle lift as a function of the verified set of feature data;
(f) prior to causing the lift control to enable the use of the selected feature, receiving an electrical signal from the lift control and comparing characteristics of the electrical signal to an expected electrical signal to determine whether an unexpected device is connected between the lift control and the authentication module; and
(g) preventing the lift control from enabling the use of the selected feature.

14. The method of claim 13, further comprising the steps of:
receiving output from the lift control and
creating a set of metrics on a storage component as a function of at least the output from the lift control.

15. The method of claim 14, wherein the set of metrics describes prior uses of the vehicle lift via the lift control and comprises a set of sensor data from sensors placed on one or more components of the vehicle lift.

16. The method of claim 15, wherein the storage component is an authentication storage of the authentication module, further comprising the steps:
(g) disconnecting the authentication module from the lift control; and
(h) causing the authentication module to be connected to a device that receives the set of metrics from the authentication module.

17. The method of claim 14, wherein the authentication module further comprises a real-time clock operable to track the passage of time without an external power source, wherein the set of metrics on the storage component comprises a set of time tracking information created using the real-time clock and associated with an authorized period of availability of the feature on the vehicle lift.

18. The method of claim 17, further comprising the steps of, at the authentication module:
determining whether the authorized period of availability has expired as a function of the set of time tracking information; and
when the authorized period of availability has expired, causing the lift control to disable the use of the feature with the vehicle lift.

19. The method of claim 14, wherein the set of metrics comprises a set of usage tracking information associated with a feature use limit for the feature, the set of usage tracking information comprising a use counter associated with a number of uses that have been made of the feature.

20. The method of claim 19, further comprising the steps of, at the authentication module:
determining whether the feature use limit has been met as a function of the set of usage tracking information; and
when the feature use limit has been met, causing the lift control to disable the use of the feature with the vehicle lift.

21. An apparatus comprising:
an authentication module configured to be installed on a lift control of a vehicle lift, the authentication module comprising a real-time clock operable to track the passage of time without an external power source, a processor, and a memory configured to store a set of feature data and a set of authorization data, wherein the set of authorization data is inaccessible by the lift control and includes a unique authentication module identifier associated with the authentication module;
wherein the authentication module is configured to:
(i) receive a set of lift data from the lift control, wherein the set of lift data comprises a unique lift control identifier associated with the lift control;
(ii) identify a portion of the set of feature data that is usable by the lift control to enable a particular feature of the vehicle lift, wherein the portion of the set of feature data comprises a unique feature identifier associated with the particular feature;
(iii) perform a feature validation comprising transforming a lift code from the set of lift data as a function of (A) a unique feature key from the set of authorization data and (B) a validation algorithm to produce a validity result;
(iv) determine a set of feature parameters for the feature of the vehicle lift as a function of the set of feature data;

(v) where the validity result indicates that the feature is valid, cause the lift control to enable the use of the feature with the vehicle lift as a function of the verified set of feature parameters;
(vi) receive output from the lift control and create a set of metrics on a storage component based at least in part upon the output from the lift control, wherein the set of metrics comprises a set of time tracking information created using the real-time clock and associated with a period of authorized availability of the feature on the vehicle lift;
(vii) determine whether the period of authorized availability has expired as a function of the time tracking information; and
(viii) when the period of authorized availability has expired, cause the lift control to disable the use of the feature with the vehicle lift.

* * * * *